US010365186B2

(12) United States Patent
Ehmke et al.

(10) Patent No.: US 10,365,186 B2
(45) Date of Patent: Jul. 30, 2019

(54) DIAGNOSTIC DEVICE FOR DETECTING AN OUT-OF-ROUNDNESS ON RAILWAY VEHICLE WHEELS IN ACCORDANCE WITH AN IMPULSE EVALUATION METHOD

(71) Applicant: Schenck Process Europe GmbH, Darmstadt (DE)

(72) Inventors: Fritz Ehmke, Modautal-Luetzelbach (DE); Viktor Rais, Modautal (DE)

(73) Assignee: Schenck Process Europe GmbH, Darmstadt (DE)

(*) Notice: Subject to any disclaimer, the term of this patent is extended or adjusted under 35 U.S.C. 154(b) by 184 days.

(21) Appl. No.: 15/695,258

(22) Filed: Sep. 5, 2017

(65) Prior Publication Data
US 2017/0363518 A1    Dec. 21, 2017

Related U.S. Application Data

(63) Continuation of application No. PCT/EP2016/000352, filed on Mar. 1, 2016.

(30) Foreign Application Priority Data

Mar. 2, 2015  (DE) ............ 10 2015 002 517

(51) Int. Cl.
*G01M 17/08*   (2006.01)
*G01M 17/10*   (2006.01)
(Continued)

(52) U.S. Cl.
CPC .......... *G01M 17/10* (2013.01); *B61K 9/02* (2013.01); *B61K 9/12* (2013.01); *B61L 1/00* (2013.01);
(Continued)

(58) Field of Classification Search
USPC .................................... 73/115.07
See application file for complete search history.

(56) References Cited

U.S. PATENT DOCUMENTS 3,844,513 A * 10/1974 Bernhardson ............ B61K 9/12
                                                     246/169 R
4,679,447 A *  7/1987 Sieradzki ............ G01B 5/0002
                                                     33/203
(Continued)

FOREIGN PATENT DOCUMENTS

DE    330 9908 A1    11/1983
DE    1994 1843 A1    3/2001
(Continued)

OTHER PUBLICATIONS

International Search Report dated May 24, 2016 (English Translation).

*Primary Examiner* — Eric S. McCall
(74) *Attorney, Agent, or Firm* — Muncy, Geissler, Olds & Lowe, P.C.

(57) ABSTRACT

A diagnostic device for determining an out-of-roundness on wheels of rail vehicles within a specified measuring section, comprising a plurality of force sensors, which are designed to determine forces acting on them and are connected to an evaluating device, wherein the evaluating device is provided for determining the out-of-roundness by integrating a force signal F, which is forwarded by the force sensors over time in order to determine an impulse. A method is also provided for determining an out-of-roundness on wheels of rail vehicles within a specified measurement section, wherein the force signals of at least one force sensor are fed to an evaluating device, the evaluating device detects an impulse, and the evaluating device integrates a force signal over a defined time interval and thereafter uses said force signal to output a result.

11 Claims, 3 Drawing Sheets

(51) Int. Cl.
  *B61K 9/12* (2006.01)
  *B61K 9/02* (2006.01)
  *B61L 1/00* (2006.01)
  *B61L 23/04* (2006.01)
  *B61L 27/00* (2006.01)

(52) U.S. Cl.
  CPC ......... *B61L 23/042* (2013.01); *B61L 27/0094* (2013.01)

(56) References Cited

U.S. PATENT DOCUMENTS

| | | | | |
|---|---|---|---|---|
| 5,577,690 | A * | 11/1996 | Haddox | B61K 9/12 246/169 R |
| 2008/0304065 | A1* | 12/2008 | Hesser | E01B 35/00 356/400 |
| 2014/0110534 | A1* | 4/2014 | Bartonek | B61K 9/12 246/169 R |
| 2016/0031458 | A1* | 2/2016 | Betancur Giraldo | B61K 9/12 73/146 |
| 2017/0169145 | A1* | 6/2017 | Ehmke | G01M 17/10 |
| 2018/0037240 | A1* | 2/2018 | Ghosh | B61K 9/12 |
| 2018/0283992 | A1* | 10/2018 | Alemi | G01M 17/10 |

FOREIGN PATENT DOCUMENTS

| | | |
|---|---|---|
| DE | 20 317201 U1 | 3/2004 |
| EP | 1197 417 A1 | 4/2002 |
| EP | 12 12 228 B1 | 4/2003 |
| EP | 183 9990 A2 | 10/2007 |
| EP | 2 631 150 A1 | 8/2013 |
| WO | WO 2006 125237 A1 | 11/2006 |

\* cited by examiner

DIAGNOSTIC DEVICE FOR DETECTING AN OUT-OF-ROUNDNESS ON RAILWAY VEHICLE WHEELS IN ACCORDANCE WITH AN IMPULSE EVALUATION METHOD

This nonprovisional application is a continuation of International Application No. PCT/EP2016/000352, which was filed on Mar. 1, 2016, and which claims priority to German Patent Application No. 10 2015 002 517.1, which was filed in Germany on Mar. 2, 2015, and which are both herein incorporated by reference.

BACKGROUND OF THE INVENTION

Field of the Invention

The invention relates to a diagnostic device for detecting an out-of-roundness of vehicle wheels of rail vehicles, within a specified measuring section, comprising a plurality of force sensors which are designed/set up for determining forces acting on them and are connected to an evaluating device, wherein the evaluating device is designed/set up for determining the out-of-roundness.

Description of the Background Art

Rail vehicles can generate unwanted vibrations when they pass by. One reason for this is, for instance, the non-round wheels with a plurality of corners or flattened sections, which are distributed over the circumference of the wheel. Out-of-roundness in rail vehicle wheels, for instance, wheels of trains, such as passenger trains or freight trains, including their locomotives, have negative effects. They lead to undesirable floor vibrations in adjacent buildings, cause a high noise emission, reduce the ride comfort, and cause damage to the vehicle and the track superstructure. There is a high risk to the safety of railway transport due to the associated risk of derailment.

Various manifestations are to be subsumed under the term out-of-roundness, such as, e.g., eccentricity, ovality, the presence of a material deposit, the presence of a flat spot/flattening, and the presence of polygonization. The formation of an ellipse is mentioned as a special form of ovality. Polygonization occurs when there are at least three corners on the outer side, namely, on the circumference of the wheel. In part, this polygonization, therefore the presence of three or more corners, may be periodic but may also be unequally distributed. An out-of-roundness is therefore present in one or more deviations from an ideal circular outer contour.

Such an out-of-roundness, differing from the ideal form of a circle, can be categorized in different orders. Thus, a first-order out-of-roundness can also to be understood as eccentricity, whereas a second-order out-of-roundness can also to be understood as ovality. A third-order out-of-roundness is a polygonization, which, depending on the markedness of the polygonization, can also assume an order greater than a third order. Up to now, it is also known to perform out-of-roundness measurements with a so-called wheel out-of-roundness tester.

The cause of the polygonization is not fully understood. However, it is partly based on the characteristic system frequencies of the track and the particular wheel set. Characteristic system frequencies are determined in particular during transit at a constant speed over stretches with consistently identical superstructure designs.

Since it is necessary to use as far as possible wheels whose rolling surface does not have flattened spots, uneven contact surfaces, or unevenly large rolling-out at the wheel rim, it is necessary to detect an out-of-roundness in the case of vehicle wheels, particularly in the rail vehicle sector. It is known that continuous vibrations are generated when a polygonal wheel rolls over a track. The track with the corresponding substructure and rail vehicle wheel therefore represent a spring-mass system, the oscillation behavior of which can be analyzed in regard to its amplitudes, period length, reverberation time, frequency, etc.

Well-known relationships in this regard are $$U = d \cdot \pi; \; T = \frac{U}{v}; \; f_n = \frac{1}{T} \cdot n = \frac{v}{U} \cdot n.$$

The diameter of the wheel is designated by d in meters, the wheel circumference by U in meters, the period length by T in seconds, the velocity by v in m/s, the order of the out-of-roundness by n, and the frequency of the n-th order of the out-of-roundness by $f_n$ in 1/s.

It is known to use two measurement ties, which define a measuring distance with a length of, for example, 1200 mm. It is also known to use four measurement ties on a measuring distance length of, for example, 2400 mm, just as it is known to use eight measurement ties over a measuring distance length of, for example, 4800 mm. The more measurement ties are used and the greater the measuring path length, the more accurate the measurement.

Devices for detecting the out-of-roundness and flat spots on wheels of railway vehicles are already known from the prior art. Thus, for example, EP 1 212 228 B1 discloses a device for detecting out-of-roundness and flat spots on vehicle wheels in rail vehicles within a defined measuring section using a plurality of force sensors to determine the vertical forces acting on the rails, wherein an evaluation device is provided which signals the out-of-roundness and flat spots. The concept disclosed therein is characterized in that the force sensors are configured as load cells which are disposed between the rails and fixed crossbeams or ties, and that the evaluation device forms an average weight load from the vertical force signals when the measuring section is traveled over and compares these with the force signal course over time and when a specified deviation is exceeded, this is signaled or displayed as an out-of-roundness or flat spot.

However, the method described therein is not independent of the spring stiffnesses defined by the tracks, ties, gaps in the ties, type of subsoil, or stiffness of the subsoil. However, direct influences due to changes in spring stiffnesses and effects of different damping of the subsoil at the installation location of the measuring device should be at least largely eliminated. The assured measuring technology properties are to be maintained and improved compared to the state of the art. Measurement uncertainties should be greatly reduced and reproducibility improved. Long-term stability is also to be improved. In summary, the disadvantages known from the prior art are to be reduced or even eliminated.

SUMMARY OF THE INVENTION

It is therefore an object of the invention to provide a diagnostic device for detecting the out-of-roundness of wheels of rail vehicles within a specified measuring section, comprising a plurality of force sensors, which are provided for determining forces acting on them and are connected to an evaluating device, the evaluating device is configured to integrate a force signal forwarded by the force sensors over time in order to determine the impulse. In the case of a railway vehicle wheel with out-of-roundness, the forwarded force signal F comprises a quasi-static force component and a dynamic force component. The quasi-static force component corresponds to the wheel contact force in the case of an ideal circular wheel. In contrast, the dynamic force component of the forwarded force signal represents the force component generated by the out-of-roundness of the rail vehicle wheel. The evaluating device is accordingly designed to determine the wheel contact force Fm. This can take place either computationally or via a filter. In addition, the evaluating device is designed to correct the forwarded force signal by the wheel contact force Fm and then to integrate the resulting dynamic force component over a time interval. When a rail vehicle travels over a measuring section, the loads can then be detected by force sensors which are arranged between the ties and the rail. A system can be used here, which is already known as the "MULTI-RAIL WheelScan."

The invention is distinguished, in particular, in that the evaluation of the sensor signals, in contrast to previously used force amplitude evaluation methods, is based on an impulse evaluation method. In contrast to the force amplitude evaluation, this impulse evaluation method does not depend on the spring stiffnesses of the components and structures as well as the subsoil in the force flow of the particular measuring point. Apart from the structural parts which are stable in the long term in regard to their spring constant, such as the rail, spacer, ribbed plate, sensor, and tie, the force transition, which is not stable in the long term, of the tie in the ballast bed and the substructure in the ground is located in the force flow. Environmental influences, such as, e.g., changes in temperature and humidity, lead to a change in particular in the stiffness and damping properties of the substructure and ground. For a better diagnosis of wheel damage such as out-of-roundness, in particular, flat spots, it is no longer the force amplitude exclusively, but in particular the impulse that is calculated and evaluated.

The difference between a force amplitude and an impulse is briefly summarized. Whereas the maximum force amplitude $F_{max}$ depends on the stiffness of the aforementioned elements, which are in the force flow, this is not the case with the impulse.

A pulse change, which is called an impulse, results from the force on a body and its duration of action. In this regard, both the amount and the direction of the force play a role. The impulse is indicated by the symbol $\vec{I}$ and given in 1 Ns (Newton seconds).

If the force F is constant over the time interval $\Delta t$, the impulse can be calculated using the following equation:

$$\vec{I} = \Delta \vec{p} = \vec{F} \cdot \Delta t. \qquad a.$$

If the force F, in contrast, is not constant, as is the case with the out-of-roundness of rail vehicle wheels, the impulse can be determined by integration if the vertical force profile F(t) over time is known:

$$\vec{I} = \Delta \vec{p} = \int \vec{F}(t) \cdot dt \qquad a.$$

The stiffer the overall layout, the higher the force amplitudes that occur. Correspondingly, it has been observed in the case of measuring devices installed in the field that, for example, larger power peaks are measured in the case of frozen soil than in soil that is not frozen. Furthermore, the impulse $\vec{I}$ generated by a flat spot is also dependent on the size of the flat spot and the speed of the rail vehicle.

The impulse $\vec{I}$ accordingly provides a conclusion on a flat spot or a wheel out-of-roundness. Because the contact time is included in the calculation, the impulse $\vec{I}$ is independent of the stiffness of the elements in the force flow.

In the case of a stiff arrangement, the duration of the impulse action is shorter and the force amplitude is greater. As the stiffness decreases, the same impulse is reduced over a longer contact period and thus the force amplitudes are smaller over time. The calculated impulse is the same for both. Because $\vec{F}(t)$ is measured with force sensors and is therefore known, the impulse $\vec{I}$ can be determined by integration over time.

Therefore, it is advantageous if the evaluating device is configured to integrate the dynamic force component over a time interval which comprises the reverberation time and ends at time t2. It is advantageous in particular if the time interval over which the dynamic force component is integrated begins between the time t0, the occurrence of the impact due to the out-of-roundness, and the time t1, the first zero crossing of the force signal F, corrected by the quasi-static wheel contact force Fm. The information obtained thereby leads to a greater accuracy of the output result of the evaluating device.

Furthermore, it is advantageous if the length of the measuring section corresponds to at least one wheel circumference of a rail vehicle, so that the entire wheel can be detected and tested by the diagnostic device.

Particularly good results are obtained if the evaluating device is designed/set up for further processing of the maximum arising force value, advantageously together with the result of the impulse evaluation.

It is expedient if the force sensors are provided in the manner of load cells, weighing beams, or weighing discs for detecting forces, such as gravity and/or weight forces. Particularly robust, reliable, and cost-effective modules can then be used.

Good coordination of costs, durability, and measuring efficiency results when at least one of the force sensors or all force sensors uses/use one or more strain gauges.

It is also advantageous if the force sensors are distributed under a plurality of rail supports, such as ties, for instance, under 5, 6, 7, 8, or 9 ties, namely, in the longitudinal direction of the rails one behind the other. The force sensors are distributed in pairs per tie.

Of course, the force sensors can also be designed as load cells, which are arranged between the rails and stationary crossbeams or ties. The load cells can be provided in a recess in the ties, the rails being supported on the load cells.

In order to achieve good measurements, it is advantageous if, at the beginning and/or at the end of the measuring section, shear stress sensors are provided in the neutral phase of the rail, which are used for force shunt correction and/or as rail switches.

It is advantageous if, on the basis of the detected vertical force signals and the shear stress measurement, the sum of the average load which represents the wagon weight is formed in addition in the evaluating device from the average wheel contact value of the individual wheels or truck and from the identified wheels or trucks for a wagon.

It is advantageous if, based on the identified wagon types and the determined wagon weight, the wagon weight is compared with a predefined maximum value in the evaluating device and is signaled as an overload when it is exceeded.

It has also proven successful if the center of gravity position is determined based on the identified wagon types and the determined average axis or truck loads in the evaluating device with the aid of predetermined axis distances and is compared with a predetermined permissible center of gravity range and when the center of gravity range is exceeded this can be signaled as a center of gravity error.

The invention also relates to a method for determining an out-of-roundness of wheels of rail vehicles within a predefined measurement range, wherein the force signals of at least one force sensor are fed to an evaluating device, the force signal F, which comprises a quasi-static and a dynamic force component, is processed in the evaluating device, by determining a quasi-static wheel contact force Fm, the force signal F is corrected by the quasi-static wheel contact force Fm, and the dynamic force component resulting from the difference of F and Fm is integrated over a time interval in order to determine an impulse.

It is thereby advantageous if the method uses a diagnostic device of the type of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
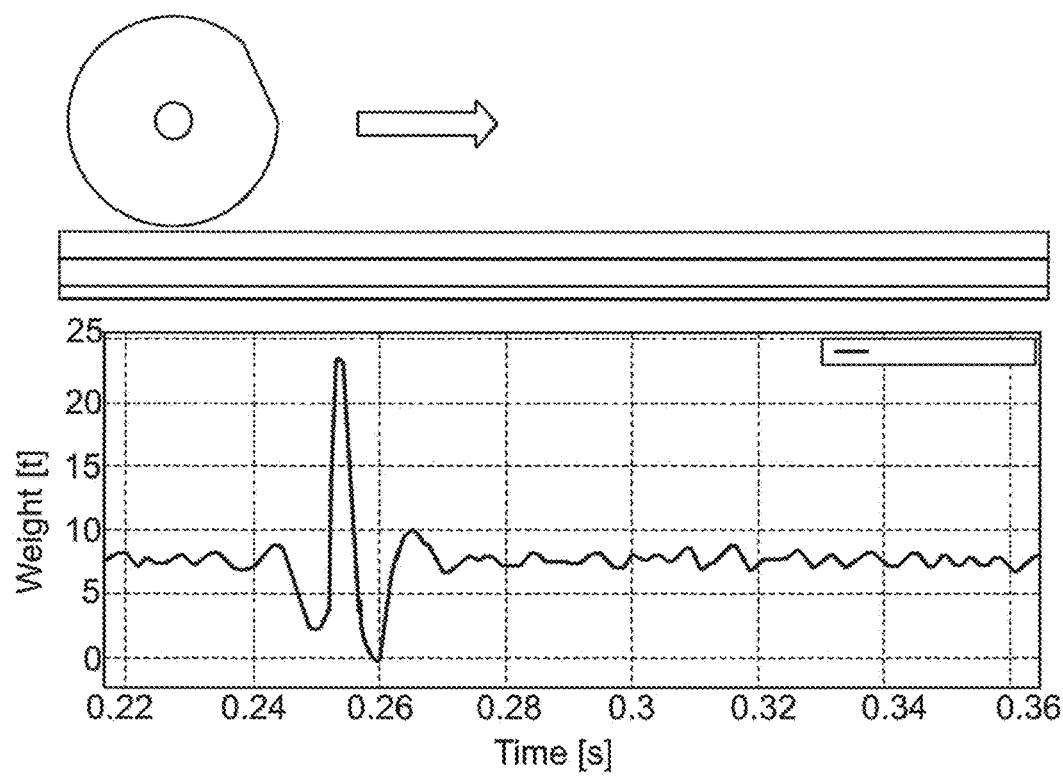
FIG. 1 shows a force signal curve plotted on the ordinate in Newtons versus the time on the abscissa in seconds as it occurs in a typical measurement of an out-of-roundness.

FIG. 1 shows the force signal curve as an out-of-round rail vehicle wheel travels over a measuring point or a measuring section. The force signal curve in Newtons on the ordinate is plotted versus the time in seconds on the abscissa. It is clear from the force signal curve that, in the area of the out-of-roundness or flattening of the rail vehicle wheel, it first experiences a drop in comparison with the average resulting from the wheel contact force, whereupon a force peak Fmax follows when the out-of-roundness strikes the rail.

Figure 2:
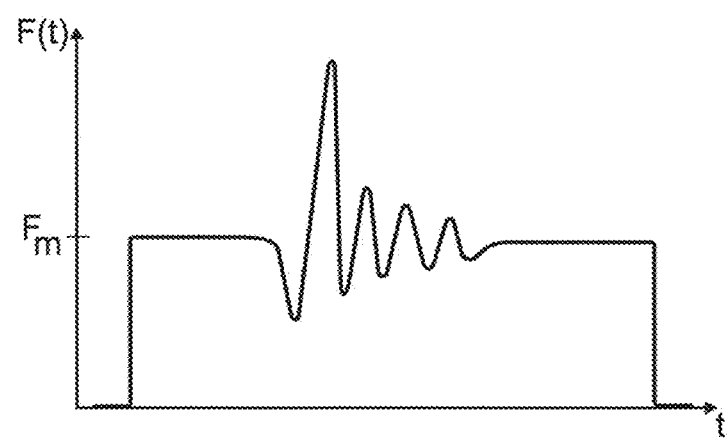
FIG. 2 shows a further force signal curve plotted on the ordinate versus the time on the abscissa, as occurs in a typical measurement of an out-of-roundness, the mean value Fm being already determined from the wheel contact force.

FIG. 2 shows a further force signal curve on the ordinate versus time on the abscissa, the mean value Fm, corresponding to the quasi-static wheel contact force, being already determined here.

To determine the impulse $\vec{I}$ with the aid of the evaluating unit, the vertical force signal is integrated over the time interval shown. In addition, the calculated impulse $\vec{I}$ is corrected by the proportion of the average $F_m$, which represents the quasi-static wheel force. The correction of the force signal can be effected by calculation or by means of a filter.

The mechanical set-up for detecting the signals illustrated in FIG. 1 or 2 has already been presented in EP 1 212 228 B1 and is to be considered as integrated here. However, unlike disclosed therein, the maximum force amplitude $F_{max}$ alone is no longer determined but the impulse caused by an out-of-roundness is determined. Thus, over a certain period of time T, the force signal deviation, taking into account the average $F_m$, is integrated according to the formula $$\vec{I} = \Delta \vec{p} = \int_{t_0}^{t_2} \vec{F}(t) \cdot dt - \int_{t_0}^{t_2} \vec{F}_m(t) \cdot dt.$$

Figure 3:
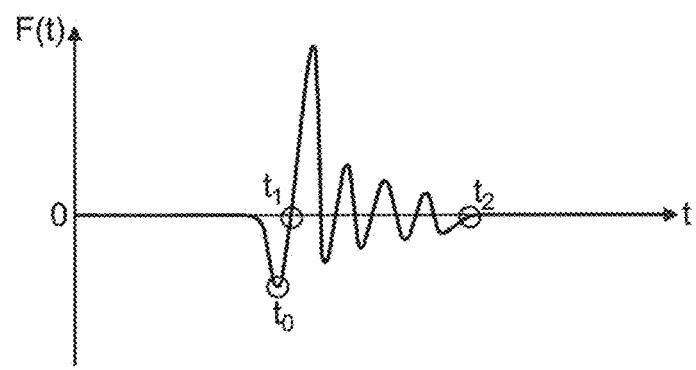
FIG. 3 shows the force signal curve from FIG. 2, the curve being shown already adjusted by the average Fm.

Finally, FIG. 3 shows the force signal curve from FIG. 2, which has already been adjusted by the average Fm or the quasi-static wheel contact force.

The detection of the impulse in the force signal curve is calculated and optimized by an evaluation algorithm. Accordingly, the starting time $t_0$ and the end time $t_2$ of the time interval T is determined via the evaluation algorithm.

Figure 4:
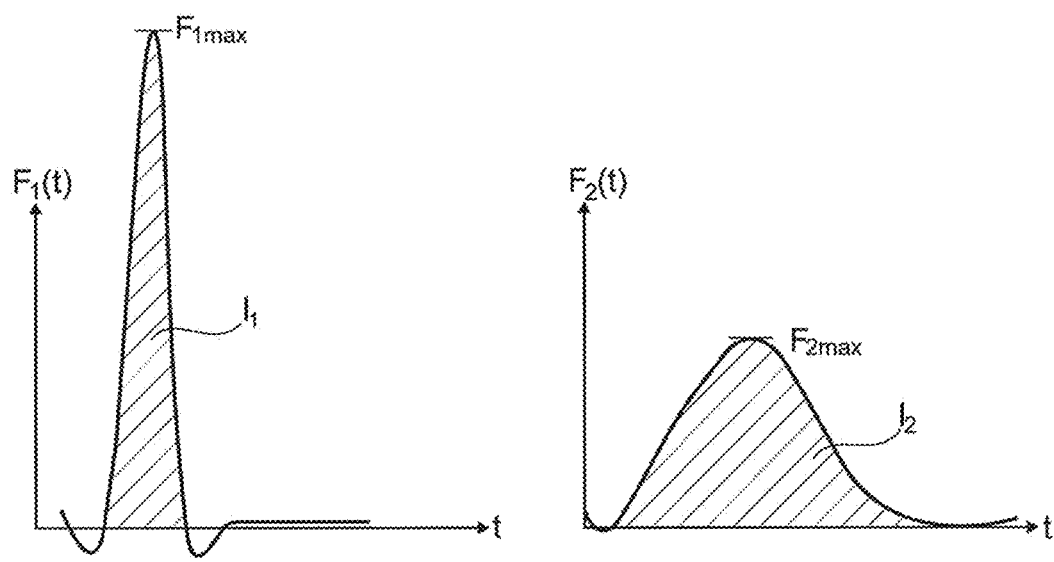
FIG. 4 shows two force signal curves F1 and F2 whose integration over time results in the same impulse I1=I2 at different force peaks F1max and F2max.

FIG. 4 shows, for a better understanding, two force signal curves F1(t) and F2(t), whose integration over time at different force peaks $F_{1max}$ And $F_{2max}$ gives the same impulse I1=I2. It is clear from this that, with different stiffnesses of the subsoil or of the measuring section, the force peaks of an out-of-roundness and also the oscillation time of the oscillation caused by the out-of-roundness can vary depending on the stiffness. Therefore, whereas the force peak provides little information on the quality of an out-of-roundness, the determined impulse can be used as a limit value for evaluating the state of a rail vehicle wheel.

Figure 5:
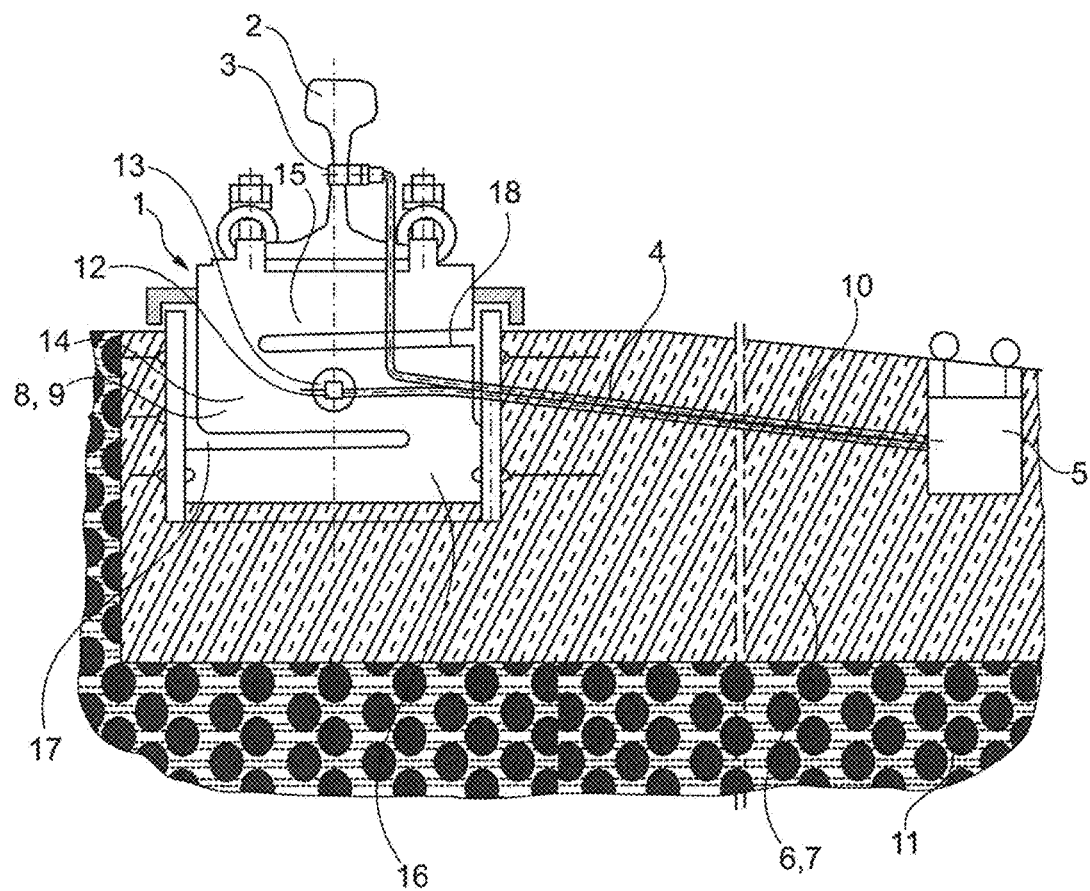
FIG. 5 shows a cross section through a rail with a diagnostic device according to a first embodiment.

FIG. 5 shows a diagnostic device 1 of the invention. Diagnostic device 1 is used for determining the out-of-roundness of wheels of rail vehicles. A rail is identified by the reference character 2. A force sensor in the form of a shear stress sensor 3 is connected to an evaluating device 5 via a first electrical line 4. A force sensor 8 is provided below rail 2 and within a crossbeam 6, which is formed as a tie 7. In this exemplary embodiment, force sensor 8 is designed in the manner of a load cell 9.

Just like shear stress sensor 3, force sensor 8 or load cell 9 is also connected to evaluating device 5 via a line, namely, a second electrical line 10. Crossbeam 6 or tie 7 rests on a ballast bed 11 or on a ballastless track.

Force sensor 8 has a strain gauge 12 which is arranged in a blind hole 13, blind hole 13 being provided in turn in a deforming body or measuring body 14. Force sensor 8 is largely defined by a force input element 15 and a force output element 16. Horizontal transverse slits 17 and 18 are provided for the defined force flow or for the defined guidance of the force from the input point via the strain gauge 12 to the load output point through force sensor 8.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A diagnostic device for detecting an out-of-roundness of a wheel of a rail vehicle within a specified measuring section, the device comprising:
a plurality of force sensors for determining forces acting on them from a rail vehicle wheel and are connected to an evaluating device, the evaluating device being configured:
to process a force signal F, forwarded by the force sensors, which comprises a quasi-static and a dynamic force component;
to determine a quasi-static wheel contact force $F_m$;
to correct the force signal F by the quasi-static wheel contact force $F_m$; and
to integrate the resulting dynamic force component over a time interval in order to determine an impulse.

2. The diagnostic device according to claim 1, wherein the time interval comprises a decay time of a reverberation and ends at a time $t_2$.

3. The diagnostic device according to claim 1, wherein the time interval begins between a time $t_0$, occurrence of the impact, and a time $t_1$, a first zero crossing of the force signal F being corrected by the quasi-static wheel contact force $F_m$.

4. The diagnostic device according to claim 1, wherein the force sensors are provided as load cells, weighing beams, or weighing discs.

5. The diagnostic device according to claim 1, wherein the evaluating device is provided for further processing of the maximum arising force amplitude $F_{max}$.

6. The diagnostic device according to claim 1, wherein at least one of the force sensors or all force sensors uses/use one or more strain gauges.

7. The diagnostic device according to claim 1, wherein the measuring section is greater than or equal to a wheel circumference of the rail vehicle wheel to be measured.

8. The diagnostic device according to claim 1, wherein the force sensors are provided between the rails and ties.

9. A method for determining an out-of-roundness of wheels of rail vehicles within a predetermined measurement section, the method comprising:
providing the force signals of at least one force sensor to an evaluating device;
processing the force signal F, which comprises a quasi-static and a dynamic force component, in the evaluating device;
determining a quasi-static wheel contact force $F_m$;
correcting the force signal F by the quasi-static wheel contact force Fm; and
integrating a dynamic force component resulting from a difference of F and Fm over a time interval to determine an impulse.

10. The method according to claim 9, wherein the time interval comprises the decay time of a reverberation.

11. The method according to claim 9, wherein the time interval begins between a time t0, the occurrence of the impact, and a time t1, the first zero crossing of the force signal F, corrected by the quasi-static wheel contact force Fm.

* * * * *